Nov. 19, 1968  A. L. NELSON  3,412,365
FLUID-PROOF BULKHEAD PLUG AND SOCKET
Filed Dec. 28, 1965

INVENTOR.
ARTHUR L. NELSON
BY
Elliott & Pastoriza
ATTORNEYS

United States Patent Office 3,412,365
Patented Nov. 19, 1968

3,412,365
FLUID-PROOF BULKHEAD PLUG AND SOCKET
Arthur L. Nelson, San Diego, Calif., assignor, by mesne assignments, to Electro-Oceanics, Inc., a corporation of California
Filed Dec. 28, 1965, Ser. No. 516,956
The portion of the term of the patent subsequent to Sept. 6, 1983, has been disclaimed and dedicated to the Public
2 Claims. (Cl. 339—60)

ABSTRACT OF THE DISCLOSURE

A bulkhead connector comprising a socket structure sealingly secured in a bulkhead with a portion of the socket positioned exterior of the bulkhead and provided with double ended openings for receiving a suitable plug. In this respect, the plug is in the form of an elongated cylindrical member which may be urged into one end of the socket thereby expelling water from the other end and resulting in electrical contact with mid-contacts disposed in the socket and on the exterior of the plug respectively. The arrangement is such that underwater connections can be effected without disturbing the bulkhead sealing structure of the socket and the contacts themselves are always maintained in a clean and dry condition.

---

This invention relates generally to fluid-proof plug and socket structures and more particularly to a fluid-proof bulkhead plug and socket for transferring electrical energy from one side of the bulkhead to a unit mounted on the other side of the bulkhead wherein the unit is subject to a fluid environment such as water.

In vessels such as ships, submarines, and other types of underwater vehicles, electrical units are often mounted on the exterior bulkhead of the vessel under the water line with suitable electrical connections to equipment within the vessel. For example, sonar transmitters usually include a transducer unit mounted on the exterior of the vessel under the water line. Information received from the sonar transducer is fed through the bulkhead to the CIC room or other compartment containing the sonar equipment. In instances wherein the sonar transducer is damaged, such as by exterior objects in the ocean colliding with the side of the vessel, or in other instances in which the transducer unit has a malfunction, it is usually necessary to place the vessel in dry dock in order to disconnect the unit and repair the same or replace it with a new unit. Drydocking the vessel is necessary because any attempt to remove the unit while under water requires breaking of the sealed connections passing through the bulkhead to the interior of the vessel with the result that the hull becomes flooded.

In the case of deep sea underwater vehicles, such as bathyspheres and the like, the environmental pressure is extremely high, and any attempt to effect repairs of a unit mounted on the high pressure exterior side of the bulkhead could result in leaks in the structure.

Drydocking a ship or other vessel is an expensive and time consuming operation and can result in serious delays in the use of the vessel, particularly during war time.

With the foregoing considerations in mind, it is accordingly a primary object of the present invention to provide a bulkhead plug and socket assembly for transferring electrical energy from one side of the bulkhead to a unit such as a sonar transducer on the other side of the bulkhead, all in a completely fluid proof manner.

More particularly, it is an object to provide a fluid proof bulkhead plug and socket for transferring electrical energy from the interior of a bulkhead to a unit mounted on the exterior of the bulkhead in a fluid environment, which may be manually unplugged to disconnect the same or plugged together to effect a connection between the unit and equipment interior of the bulkhead, by divers in order that the unit may be easily replaced or repaired without in any way damaging the bulkhead or requiring drydocking of the vessel.

Briefly, these and other objects and advantages of this invention are attained by providing a fluid proof plug and socket structure in combination with pressure sealed connecting means passing through the bulkhead. The plug connects through an integrally formed insulated cable to a unit adapted to be mounted on the exterior of the bulkhead, and the socket connects in a fluid proof manner to the pressure sealed connecting means passing through the bulkhead.

Portions of the plug and sockets themselves are designed in accordance with the principles of underwater or fluid proof connectors described in my copending patent application, Ser. No. 490,256, filed Sept. 27, 1965, and entitled, "Fluid Proof Connector," now U.S. Patent 3,277,424. By such design, the plug may be inserted in the socket to effect a fluid proof contact between plug and socket contacts even though such connection is effected under water and under high pressure.

The pressure sealed connecting means passing through the bulkhead is integrally formed with the socket and includes various features described in my other copending patent application, Ser. No. 510,750, filed Dec. 1, 1965 and entitled "Pressure Sealed Connecting Device," now abandoned.

With the foregoing combination, it is possible for a diver to simply unplug the plug from the socket and remove a unit mounted on the exterior of the bulkhead without in any manner disturbing the bulkhead, and reconnect another unit for operation while under water, all to the end that the various objects of this invention heretofore set forth can be fully realized.

A better understanding of the invention will be had by now referring to one embodiment thereof as illustrated in the accompanying drawings, in which.

Figure 1:
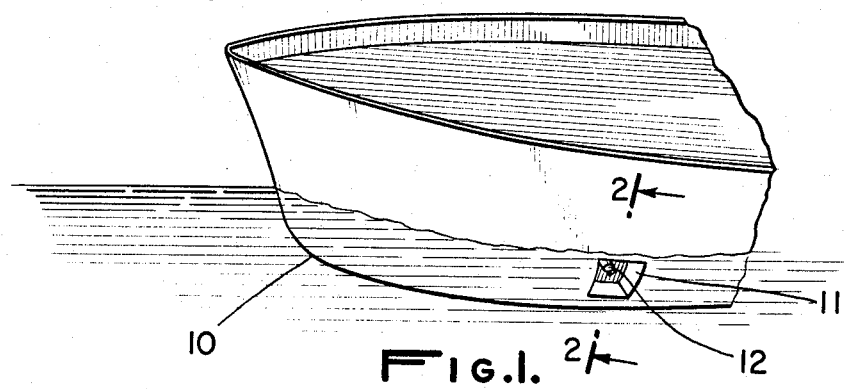
FIGURE 1 is a fragmentary perspective view of a portion of a ship or submarine illustrating a unit mounted on an exterior bulkhead portion of the vessel.

Referring to FIGURE 1, there is shown a vessel 10 which may be a ship or submarine, including an exterior hull or bulkhead recessed area 11 upon which an exterior unit, such as a sonar transducer 12, is mounted. Normally, the transducer 12 will be under water, and in the case of submarines or other deep sea vessels, will be subject to a considerable water pressure.

Figures 2, 3:
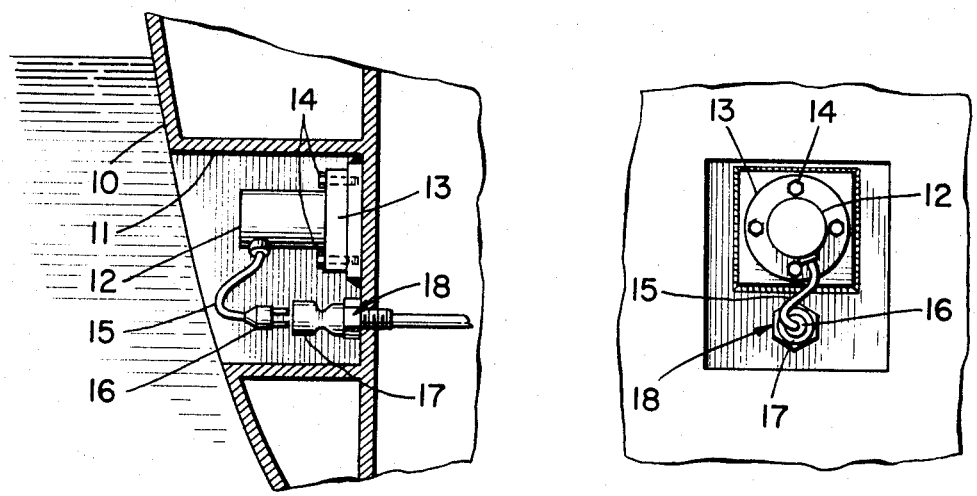
FIGURE 2 is an enlarged fragmentary cross section in the direction of the arrows 2—2 of FIGURE 1.
FIGURE 3 is a fragmentary front view of the structure illustrated in FIGURE 2; and, FIGURE 4 is an enlarged exploded cross-sectional view illustrating details of the bulkhead plug and socket assembly.

As illustrated in both FIGURES 2 and 3, the unit 12 is mounted as by a base plate 13 and bolts 14 to the exterior of the inner portion of the bulkhead recess 11, all in an external manner such that the unit 12 may be readily removed by simply removing the bolts 14 without disrupting the bulkhead itself. An insulated cable 15 extends from the unit 12 and terminates in a plug body 16. The plug body 16 is designed to cooperate with a socket body 17 for transferring electrical energy between the unit 12 and the interior of the bulkhead through a pressure-sealed connecting means 18.

Figure 4:
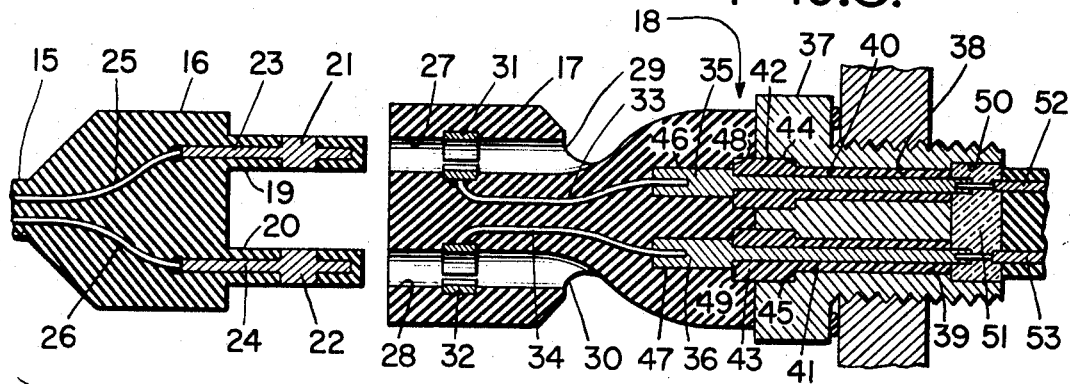

The plug body 16 and socket body 17 together with the pressure sealed connecting means for the bulkhead are illustrated in greater detail in the cross section of FIGURE 4. In this figure, as well as in FIGURE 2, the plug 16 is shown disconnected from the socket 17 but in a position preparatory to effecting an electrical connection from the unit 12 to the interior of the bulkhead.

Referring first to the plug body 16, it will be noted that this body has first and second elongated plugs 19 and 20 of given cross-sectional dimensions throughout their length. These plugs include plug contacts 21 and 22 constituting enlarged diameter portions of elongated rods 23 and 24 embedded longitudinally within the plugs 19 and 20. The exterior surface of the plug contacts are intermediate the ends of the plugs and define cylindrical surfaces substantially flush with the remaining cylindrical surface portions of the plugs. The rod structures 23 and 24 serve the dual function of stiffening the plugs and connecting the contacts to suitable wires such as indicated at 25 and 26 passing from the main portion of the plug body 16 to the cable 15.

The socket body 17 includes first and second elongated sockets 27 and 28 having cross-sectional dimensions throughout a major portion of their lengths corresponding to the given cross-sectional dimensions of the plugs 19 and 20. As shown, the inner ends of the sockets communicate with the exterior of the plug through end openings 29 and 30. The sockets, respectively, include socket contacts in the form of split rings 31 and 32 embedded in the interior walls of the socket and having inner contact surfaces of cylindrical shape extending slightly beyond a flush relationship with the interior wall of the socket. By this arrangement, the split rings 31 and 32 are capable of circumferential expansion and contraction. The socket contacts 31 and 32 connect through conductors 33 and 34 to conducting pins 35 and 36 constituting part of the pressure sealed connecting means 18 passing through the bulkhead.

As shown to the right in FIGURE 4, this pressure sealed connecting means includes a header member 37 threadedly positioned in a permanent manner within a suitable opening in the bulkhead and including first and second bores 38 and 39 receiving sleeves 40 and 41 of electrically insulating material of high resiliency and substantially no cold-flow characteristics which line the interior of the bores. These sleeves, as shown, have enlarged portions 42 and 43 seating on annular shoulders 44 and 45 formed in the ends of the bores in the header 37. The pins 35 and 36 pass through the sleeves in sealing engagement with the inner surface of the sleeves, the end portions of the pins extending towards the exterior side of the bulkhead and connecting to the leads 33 and 34 having enlarged diameter portions 46 and 47 to define annular shoulders 48 and 49 seating on the end surfaces of the enlarged portions of the sleeves. With this arrangement, high pressure exerted on the exterior side of the bulkhead is applied to the sleeves and pins in directions tending to increase the seating forces on the annular shoulders in the bore and the annular end surfaces of the sleeves to effect a fluid and pressure tight seal.

The interior side of the pressure sealed header portion 37 is counter-bored as at 50 and filled with a suitable epoxy 51 to seal the physical connection of the inner ends of the pins 35 and 36 to conductors 52 and 53 leading to equipment in the sonar room in the ship or other operating area.

In the operation of the bulkhead plug and socket structure of this invention, the pressure sealed connecting means 18 described in detail in FIGURE 4 and indicated generally in FIGURES 2 and 3 is permanently secured to the bulkhead in a convenient position to support the socket body 17. The unit 12 in turn is bolted as by the bolts 14 within the recessed area 11 of the bulkhead and the plug body 16 at the end of cable 15 is then simply inserted in the socket body 17.

Since the cross-sectional dimensions of the respective plugs correspond to the cross-sectional dimensions of the sockets, insertion of the plugs within the socket will purge any water in the sockets out the inner ends 29 and 30 shown in FIGURE 4, at the same time effecting a wiping action of the exterior plug surfaces and interior wall surfaces of the sockets. This wiping action removes all fluid and any other foreign particles and assures that when the plug contacts 21 and 22 are positioned within the split ring contacts 31 and 32, the contacts themselves are clean and dry. Further, the insulating portions of the plugs and sockets on either side of the contacts provide a complete sealing over 360° so that the contacts are maintained in a clean and dry condition.

The open ends of the inner portions of the sockets as indicated at 29 and 30 also provide the additional advantage of communicating a balanced pressure acting on the plugs when the same are inserted in the sockets. This feature is important at great depths wherein it would be otherwise difficult to remove or insert the plugs in the corresponding sockets. Thus, certain features and advantages described in my first mentioned co-pending application, Ser. No. 490,256, are inherent in the present design.

With the plug properly seated in the socket, the sonar transducer 12 will be connected to suitable cables in the interior of the bulkhead and may operate in a normal manner.

If now the sonar unit should be damaged from some cause or other, it is a simple matter for divers to lower themselves to the recessed area 11 and remove the unit 12 by removing the bolts 14. At the same time, the plug 16 is simply pulled from the socket body 17, and the entire unit, together with its connected plug, brought to the surface for repair or replacement by another unit. The replacement of the other unit is effected by simply bolting the other unit or new unit to the side of the bulkhead, utilizing the same bolts 14 and then inserting the new plug in the socket 17. This latter operation may be carried out entirely under water without in any way disrupting the bulkhead or resulting in any seepage of water through the bulkhead.

From the foregoing description, it will thus be evident that the present invention has provided an extremely useful and valuable means whereby underwater units secured to the exterior bulkheads of various underwater or surface structures can be very easily replaced without the necessity of drydocking the vessel.

While the cross-sectional dimensions of the sockets have been defined as corresponding substantially to the cross-sectional dimensions of the plugs, it is meant by these terms that the dimensions are such as to realize a desired interference type fit or snug-fit configuration sufficient to provide a complete fluid proofing. Thus, the sockets could be purposely molded to a slightly smaller internal diameter than the plug external diameter, thereby resulting in a force-fit, the internal diameter expanding somewhat as a consequence of the resilient material of the socket and the split rings similarly circumferentially expanding to accommodate the plug contacts. These very slight differences in diameter or cross-sectional dimensions are deemed to be encompassed within the statement that the cross-sectional dimensions substantially correspond.

What is claimed is:

1. A fluid proof bulkhead plug and socket for transferring electrical energy from the interior of a bulkhead to a unit mounted on the exterior of said bulkhead in a fluid environment comprising, in combination: an insulating input cable extending from said unit and terminating in a plug body, said plug body including at least one elongated plug of given cross-sectional dimensions; at least one plug contact intermediates the ends of said plug; a socket body having at least one elongated socket of cross-sectional dimensions throughout at least a portion of its length corresponding to said given cross-sectional dimensions of said plug, the inner end of said socket communicating with said fluid environment exterior of said socket body; at least one socket contact in the interior wall of said socket intermediate the ends of said socket; means mounting said socket to the exterior of said bulkhead and including means defining a bore passing through said bulkhead, said bore having an increased diameter portion to define an annular shoulder facing in the direction of the high pressure side of said structure; a sleeve of electrically insulating material of high resiliency and substantially no cold flow characteristics lining the interior of said bore with an enlarged portion seating on said annular shoulder; and an electrically conducting pin passing through said sleeve in sealing engagement with the inner surface of said sleeve, the end portion of said pin extending towards the exterior of said bulkhead having an enlarged diameter to define an annular shoulder seating on an end surface of the enlarged portion of said sleeve, the enlarged diameter portion of said pin being embedded in a portion of said socket body and being electrically connected to said socket contact, whereby fluid pressure exerted on the exterior of said bulkhead is applied to said sleeve and pin in directions tending to increase the seating force on said annular shoulder in said bore and said annular end surface of said sleeve to effect a fluid proof seal, and whereby insertion of said plug into said socket urges fluid in said socket through said inner end to the exterior of said socket, said plug being inserted a distance such that said plug contact engages said socket contact and exterior portions of said plug on either side of said plug contact engage interior portions of the wall of said socket on either side of said socket contact to shield said contacts from said fluid so that a fluid proof connection is effected from said unit to the interior of said bulkhead.

2. The subject matter of claim 1, in which said plug body includes at least one additional elongated plug in parallel spaced relationship to said first mentioned plug and said socket body includes at least one additional elongated socket positioned to receive said additional plug, said additional plug and socket including additional plug and socket contacts respectively and being similar to said first mentioned plug and socket, said additional plug and socket contacts connecting to said unit and pressure sealed connecting means respectively whereby multiple fluid proof connections may be effected from said unit to the interior of said bulkhead.

References Cited
UNITED STATES PATENTS

| | | | |
|---|---|---|---|
| 2,619,515 | 11/1952 | Doane | 339—94 |
| 3,111,356 | 11/1963 | Mazzagatti et al. | 339—154 |
| 3,271,727 | 9/1966 | Nelson | 339—60 |
| 3,290,639 | 12/1966 | Driemeyer | 339—94 |

MARVIN A. CHAMPION, *Primary Examiner.*

JOSEPH H. McGLYNN, *Assistant Examiner.*